United States Patent [19]

Fantone

[11] Patent Number: 4,870,496
[45] Date of Patent: Sep. 26, 1989

[54] OPTICAL SYSTEM FOR PROJECTING AN IMAGE ONTO A LOW RESOLUTION PHOTODETECTOR

[75] Inventor: Stephen D. Fantone, Lynnfield, Mass.

[73] Assignee: James C. Wickstead, Mendham, N.J.

[21] Appl. No.: 126,803

[22] Filed: Dec. 1, 1987

Related U.S. Application Data

[63] Continuation-in-part of Ser. No. 938,087, Dec. 4, 1986.

[51] Int. Cl.$^4$ ............................................. H04N 5/225
[52] U.S. Cl. ..................................... 358/225; 350/432
[58] Field of Search ........................ 350/439, 432, 438; 358/225, 228

[56] References Cited

U.S. PATENT DOCUMENTS

| | | | |
|---|---|---|---|
| 4,288,513 | 9/1981 | Kilichowski et al. | 430/28 |
| 4,310,222 | 1/1982 | Ikemori | 350/432 |
| 4,584,606 | 4/1986 | Nagasaki | 358/225 |
| 4,687,282 | 8/1987 | Ferrante | 350/3.7 |

Primary Examiner—Jin F. Ng
Assistant Examiner—Stephen Brinich
Attorney, Agent, or Firm—Blum Kaplan

[57] ABSTRACT

The invention is generally directed to an optical system for a CCD light sensor based camcorder. A plastic lens mechanism focuses outside light onto the CCD light sensor. An infrared filtering member in the optical path between the outside light and CCD light sensor attenuates the infrared portion of the spectrum from the outside light. A second filtering mechanism in the optical path between the outside light and CCD light sensor attenuates a portion of the spectrum from the outside light having a wavelength shorter than a cutoff wavelength. As a result, only a portion of the outside light in a pass band between the cutoff wavelength and the infrared portion of the spectrum reaches the CCD light sensor.

34 Claims, 7 Drawing Sheets

OPTICAL SYSTEM FOR PROJECTING AN IMAGE ONTO A LOW RESOLUTION PHOTODETECTOR

This application is a continuation-in-part of application Ser. No. 938,087 filed on Dec. 4, 1986.

BACKGROUND OF THE INVENTION

The invention is directed to the optics for a unitary video camera recorder (camcorder) and in particular to the optics used with a charge coupled device (CCD) based portable camcorder providing low resolution black and white video and audio recording and playback at low cost.

With the explosion in production of video components and in particular video recording cameras, the combined camera recorder (camcorder) has increased in popularity. Camcorders are self-contained camera recorder units which allow recording and usually play back, of live events. The camcorders are produced in the standard VHS, BETA and 8MM formats used in home video cassette recording units. These camcorders utilize sophisticated circuitry and optics in an attempt to achieve recording capabilities comparable with professional video equipment. To do this, optics capable of producing a high resolution display are utilized. The circuitry is also geared to resolving a higher number of lines and the video tape stores enormous amounts of information required for the high bandwidth (2-4 MHz) needed to produce a high resolution color tv signal. The high bandwidth requirements require accurate and therefore expensive optics, circuitry and tape drive and head mechanisms for reliable functioning. These functional constraints coupled with the desire for portability significantly increase the cost of the system.

There is a need for inexpensive camcorders which function adequately with low resolution displays. The low resolution camcorders are particularly useful, if relatively inexpensive, as toys for children, as baby or child monitors, as security cameras for use in private homes and industrial locations, and for various other uses. There is also a desire for extreme miniaturization and lightness. High resolution camcorders, of the type now available commercially, cost in excess of $1,000. Much of the bulk and cost of presently available camcorders is attributable to the heavy glass optics used for color correction, zoom lenses and chromatic aberation correction. Accordingly, there is a need for a light, compact and inexpensive optical system adapted for use with a CCD based portable camcorder providing low resolution video and audio recording at low cost.

SUMMARY OF THE INVENTION

The invention is generally directed to an optical system for a CCD light sensor based camcorder. A lens assembly focuses outside light onto the CCD light sensor. An infrared filter mechanism in the optical path between the outside light and CCD light sensor attenuates the infrared portion of the spectrum from the outside light. A second filtering mechanism in the optical path between the outside light and CCD light sensor attenuates a portion of the spectrum from the outside light having a wavelength shorter than a cutoff wavelength. As a result, only a portion of the outside light in a pass band between the cutoff wavelength and the infrared portion of the spectrum reaches the CCD light sensor.

Accordingly, it is an object of the invention to provide an improved optical system for a CCD light sensor based camcorder.

Another object of the invention is to provide an improved, compact, lower cost improved optical system for a CCD light sensor based camcorder.

A further object of the invention is to provide a light, compact, and inexpensive optical system adapted for use with a CCD based portable camcorder providing lower resolution black and white video and audio recording and playback at low cost.

Yet a further object of the invention is to provide an improved optical system for a CCD based camcorder including a meniscus, preferably aspheric, lens, infrared filter and yellow-orange filter for providing a limited path band between about 500 and 700 nm.

Still other objects and advantages of the invention will in part be obvious and will in part be apparent from the specification.

The invention accordingly comprises the features of construction, combinations of elements, and arrangements of parts which will be exemplified in the constructions hereinafter set forth, and the scope of the invention will be indicated in the claims.

BRIEF DESCRIPTION OF THE DRAWINGS

For a further understanding of the invention, reference is had to the following description taken in connection with the accompanying drawings, in which.

DETAILED DESCRIPTION OF THE PREFERRED EMBODIMENTS

Figure 1:
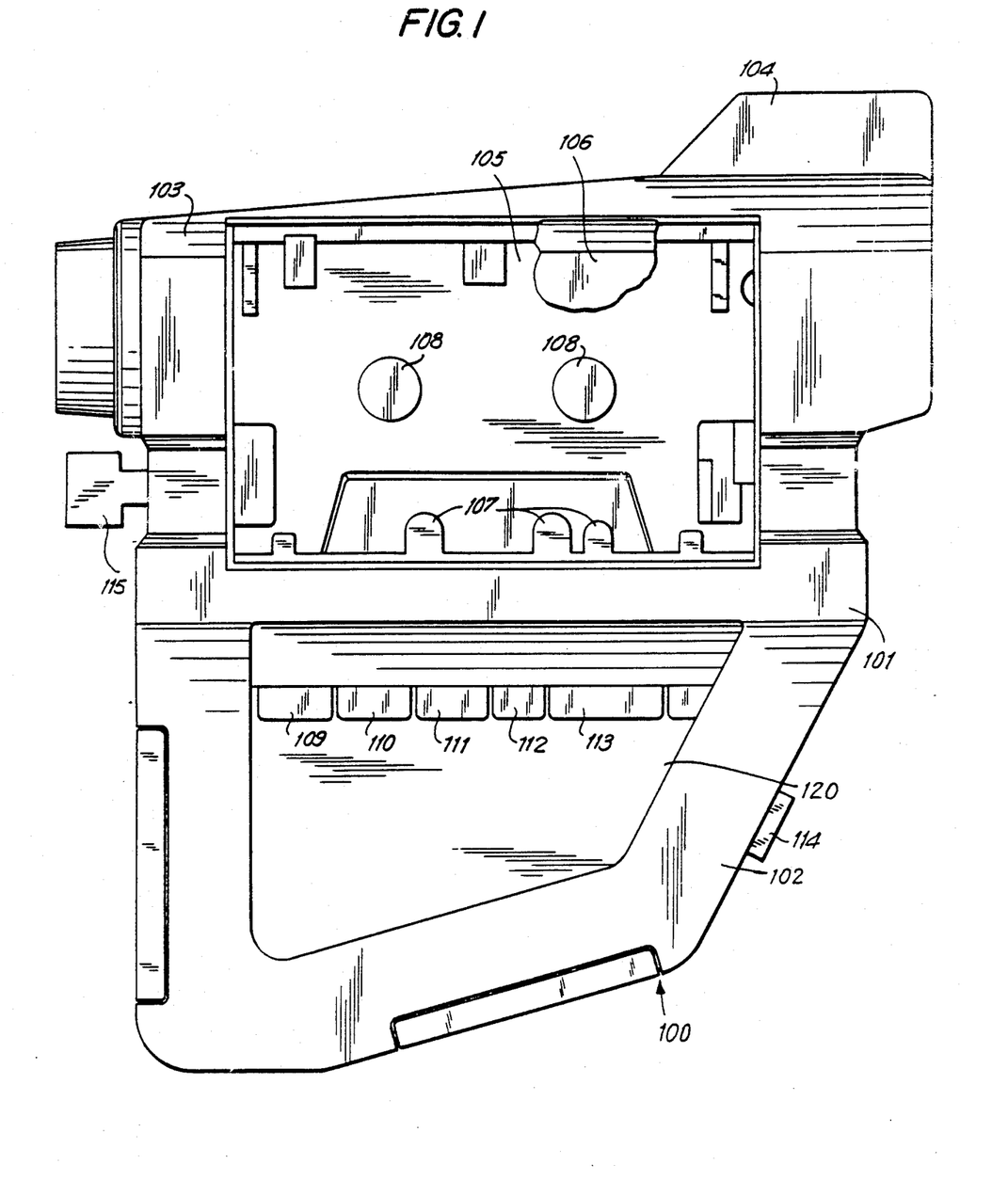
FIG. 1 is a side elevational view of a camcorder constructed in accordance with a preferred embodiment of the invention.

Reference is made to FIG. 1 wherein a camcorder, generally indicated as 100 constructed in accordance with a preferred embodiment of the invention is depicted. Camcorder 100 has a case 101 which includes a handle portion 102. Camcorder 100 has an optical input portion 103 and a view finder 104. Camcorder 100 has a tape compartment 105 sized to receive a standard audio cassette. Tape compartment 105 is closed by a tape compartment door 106 which is hinged at the top and protects the tape heads 107. The tape compartment also includes drive shafts 108 used to advance the tape within the cassette. Handle 102 defines an interior space 120 to allow the user to easily hold the handle. Interior space 120 also protects control buttons 109, 110, 111, 112, 113 and 114 which are used to control record/playback operation, tape movement and tape ejection. A microphone 115 is used to receive sound for recording on the tape.

Camcorder 100 is adapted to be held and operated with one hand. The user sights the subject through viewfinder 104, presses the appropriate control button to begin recording and follows the subject through the viewfinder. The recording process can be stopped, the tape rewound and the recorded video signal output for display on a television or specially designed monitor.

Figure 2:
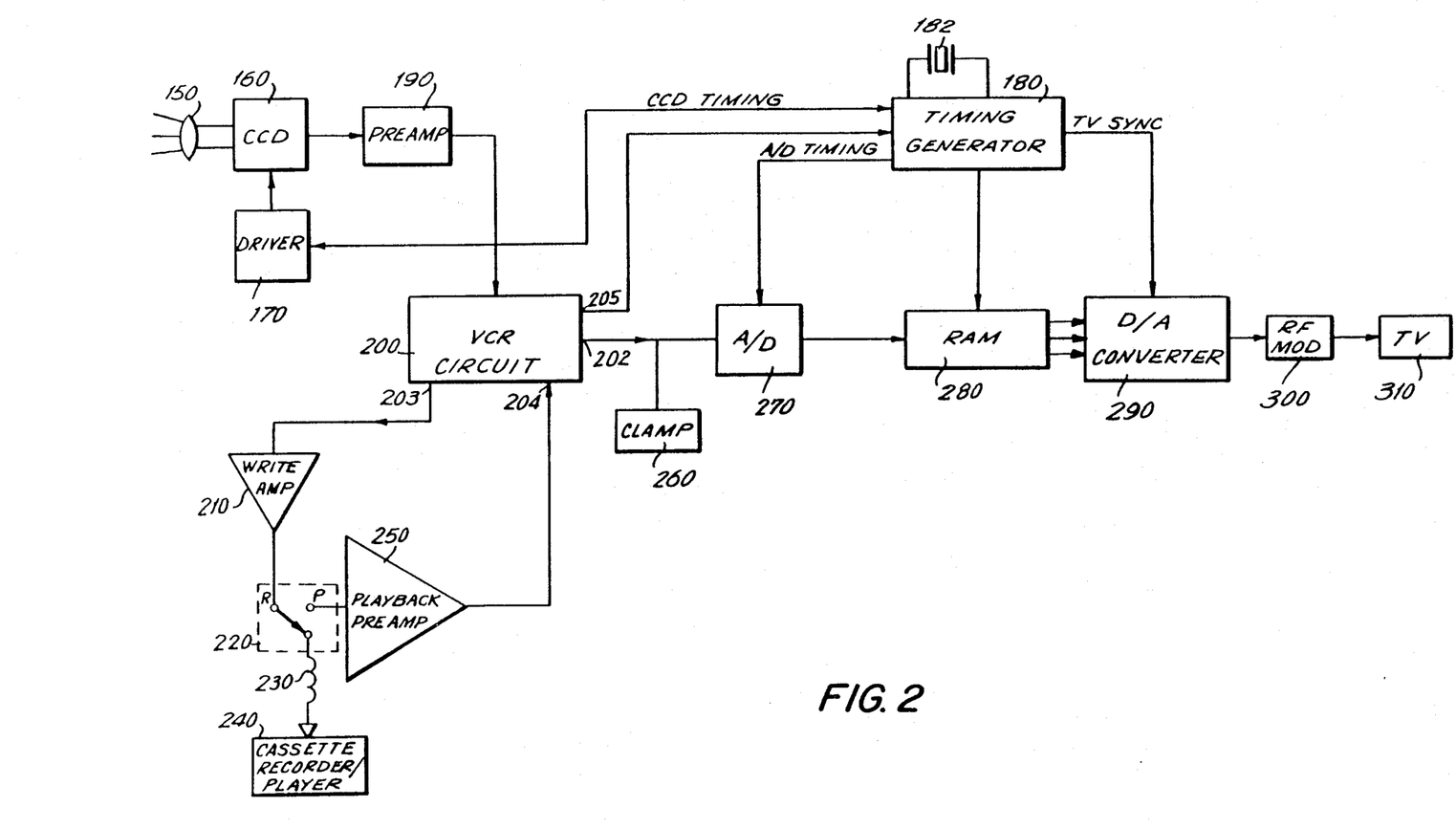
FIG. 2 is a functional block diagram of the camcorder constructed in accordance with a preferred embodiment of the invention.

Reference is made to FIG. 2 wherein a functional block diagram of the camcorder, generally indicated as 100, constructed in accordance with a preferred embodiment of the invention is depicted. Camcorder 100 includes a lens 150. In a preferred embodiment, lens 150 is an aspheric lens. The incoming light travels an optical path through lens 150 and contacts charge coupled device (CCD) array 160. The CCD array is a 90×120 element matrix for a black and white picture although color images can also be produced. This creates 10,800 pixels, about one quarter of the pixels in a standard television system. CCD array 160 is driven by a CCD driver 170 controlled by a timing generator 180. Driving generator 180 is synchronized by a crystal 182. Timing generator 180 also produces other timing signals used throughout camcorder 100. CCD array 160 generates a video output by integrating the light to which the pixels are exposed which is amplified by a preamplifier 190. CCD array 160, which is a frame transfer device, generally has an output on the order of 100 mv. In the preferred embodiment preamplifier 190 amplifies the CCD array output by a factor of five to provide a 0.5 V peak to peak output voltage.

The amplified video signal is then input to a video cassette recorder (VCR) circuit 200. VCR circuit 200, which in a preferred embodiment is a VLSI chip, described in greater detail with respect to FIG. 7, includes circuitry for processing the video input signal received from CCD array 160 into an FM signal suitable for storage on magnetic tape. VCR circuitry 200 receives a horizontal sync pulse at input terminal 202 from timing generator 180. VCR chip 200 outputs the frequency modulated signal to a write amplifier 210 which amplifies the signal to an appropriate level.

The output of the write amplifier 210 is stored on magnetic audio tape in cassette recorder/player 240. A record/playback switch 220 and head 230 are between write amplifier 210 and cassette recorder/player 240. Cassette recorder/player 240 is adapted to record and play on standard audio cassettes which ordinarily have a clean bandwidth of about 12–15 kHz. Cassette recorder/player 240 drives the audio tape about eight times faster than the standard cassette rate of 1⅞ inches per second. This results in a clear bandwidth in excess of about 100 kHz on the standard audio cassette. This bandwidth is compared with the 2–4 MHz bandwidth of standard color TV signals.

For playback, cassette player 240 is operated in its playback mode and switch 220 is switched from its record to its playback position. This connects head 230 to playback preamplifier 250 rather than write amplifier 210. Head 230 outputs a signal to playback preamplifier 250. Playback preamplifier 250 amplifies the signal output from cassette recorder/player 240 to a level appropriate for VCR chip 200 at tape input terminal 204. VCR Chip 200 converts the stored signal into a video signal which is output at video output terminal 202. The video signal output from video output terminal 202 has black levels fixed to an appropriate level by clamping circuit 260. The clamped video signal is then fed into an analog to digital (A/D) converter circuit 270 which converts the analog video signal into a digital video signal. A/D circuit 270 receives timing signals from timing generator 180. The A/D timing signals are synchronous with the timing for a pixel and are successive approximation signals so that the digital signals output from A/D converter 270 can be fed pixel by pixel into the random access memory (RAM) 280.

RAM 280 is configured to hold two complete frames of video information. While one frame is receiving, pixel-by-pixel the digital video information, the other frame of video information is output to television 310 through digital to analog (D/A) converter 290, which receives the television sync signals from timing generator 180. The analog signal is transmitted to television 310 through RF modulator 300.

The 90–100 kHz bandwidth of camcorder 100, as compared to the 2–4 MHz bandwidths of standard color television broadcasts, allows for significant reductions in speeds of the various components and thus, decreased costs. However, the reduced bandwidth also reduces the information which can be transmitted within a given time period. As a result, a reduced resolution picture is created. To increase the resolution of the image at the reduced bandwidth, VCR circuit 200 takes longer than the standard TV scanning time for a signal frame to output a full frame of pixel information to RA 280. In practice a full frame of pixels is transmitted from VCR circuit 200 to RAM 280 in the time a standard television would display four frames. As a result, while one frame in RAM 280 is receiving a new video image, television 310 is repeatedly displaying the image stored in the other frame of RAM 280. The output of video signals from RAM 280 utilizes a ping pong type effect. When frame one in RAM 280 receives new video information from VCR circuit 200 the video image stored in frame two is output and displayed on TV 310. As soon as frame one has a complete image, signaled by the vertical sync pulse produced by timing generator 180 the video image in frame one is output to television 310 and the next video image is input to frame two. Thus, when frame two has received a complete new video image, that image is output to television 310 and frame one begins receiving another video frame. In this way the resolution of the video signal is improved beyond the bandwidth capacity for a real time television system while allowing display on a standard television. This type of system is known as slow scan TV because there is reduced dynamic imaging due to the repetitive display of screens In the preferred embodiment the video system operates with a rate of 180 kHz which results in 5.5 $\mu$s/pixel although variations in this rate are suitable.

Figure 3:
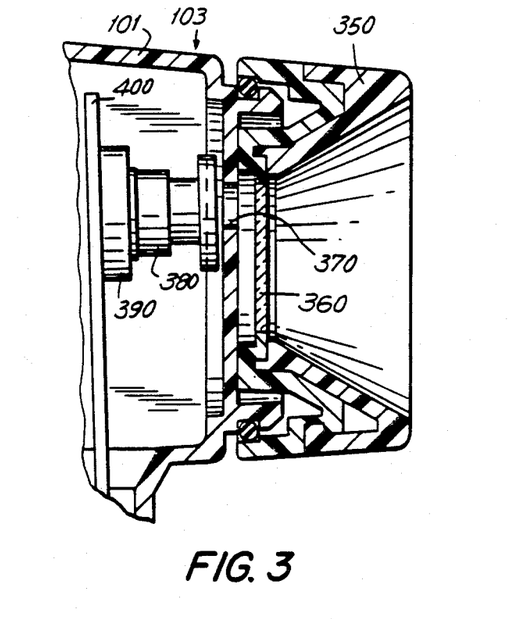
FIG. 3 is an enlarged side elevational view, partially cut away, of the optical system of the camcorder constructed in accordance with a preferred embodiment of the invention.

Reference is next made to FIG. 3 wherein a cut-away side elevational view of optical portion 103 of camcorder 100 is shown in greater detail. A CCD array chip 390 is secured to a PC board 400. The CCD array has an output level of approximately 100 mV. A lens holder 380, which secures the lens in place and aligns the lens with the CCD array, is coupled to the CCD array 390. An opening 370 in case 101 is aligned with lens holder 380 to allow light to contact lens holder 380 for transmission to CCD array 390. A protective layer 360 seals off opening 370 and lens holder 380 from the exterior. Protective layer 360 may be a clear plastic or include a filter. In either case protective layer 360 protects the lens and CCD array from damage and dust which would significantly degrade the picture quality. The light contacting the active portion of CCD array 390 is transmitted through only a small portion of protective layer 360. Accordingly, a variety of filters for different light conditions may be incorporated in protective layer 360 and rotation of layer 360 to place the appropriate portion in front of CCD array 390 may be utilized.

A flared section 350, coupled to the exterior of case 101 surrounds protective layer 360. A lens cap (not shown) can be utilized to further protect protective layer 360 and the other optical components when the camcorder is not in use.

Figure 4:
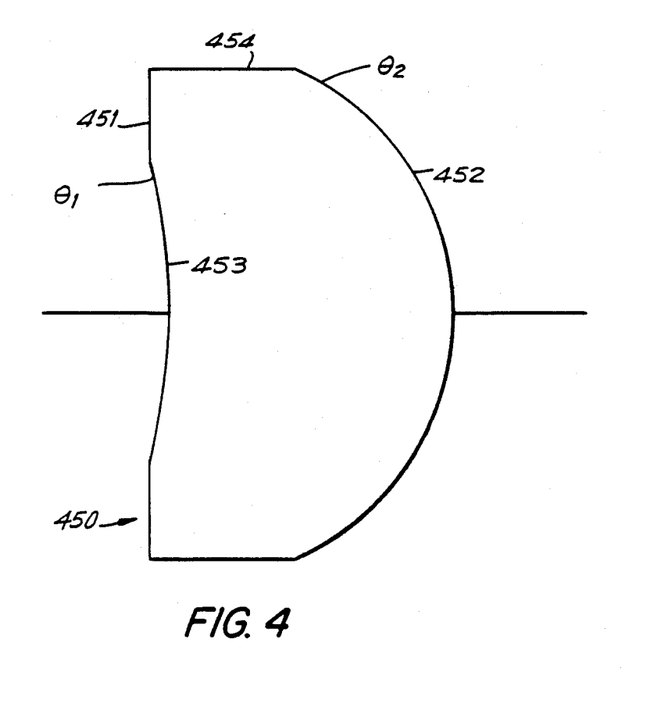
FIG. 4 is a side elevational view of an aspheric lens utilized in the optical system of the camcorder.

Reference is next made to FIG. 4 wherein a side elevational view of a lens 450 constructed in accordance with a first embodiment of the invention is depicted. Lens 450 has a front face 451 and a back face 452. Light enters lens 450 through front face 451, proceeding through lens 450 and exiting through back face 452. Lens 450 is an aspheric lens of circular cross section with the diameter of edge 454 being about 2.75 mm and the thickness from face 451 to the furthest point of surface 452 being about 1.5 mm. As a result of these small dimensions, the use of a lens holder 380, described above, is essential to assure proper and reliable alignment and safety of the lens.

Lens 450 includes a shallow, concave aspheric front surface 453 whose apex is located at the center of curvature of a spherical back surface 452. While lens surface 453 is preferably aspheric, it may also be spherical, although this results in some degradation of image quality. This degradation can be reduced by decreasing the size of aperture stop member 602 (FIG. 9), which is placed proximate to or in contact with surface 453. As a result, the center thickness of lens 450 is substantially equal to the radius of back surface 452. The radius of curvature of concave aspherical front surface 453 identified as $\theta_1$ is approximately 8.8 mm. The radius of curvature of back surface 452, identified as $\theta_2$ is about 1.6 mm. This design produces a lens which has a fixed focus from about one inch out to infinity. The image field about three feet way from the lens is approximately 20 inches by 15 inches. The lens may be made of a variety of materials. However, in a preferred embodiment the lens 450 is manufactured, of plastic (preferably acrylic) of meniscus form. In one preferred embodiment the lens is formed as a single acrylic piece with a yellow tint which filters out more than 85 percent of the light having wavelengths less than about 520 nm, i.e.) blue light.

Figure 9:
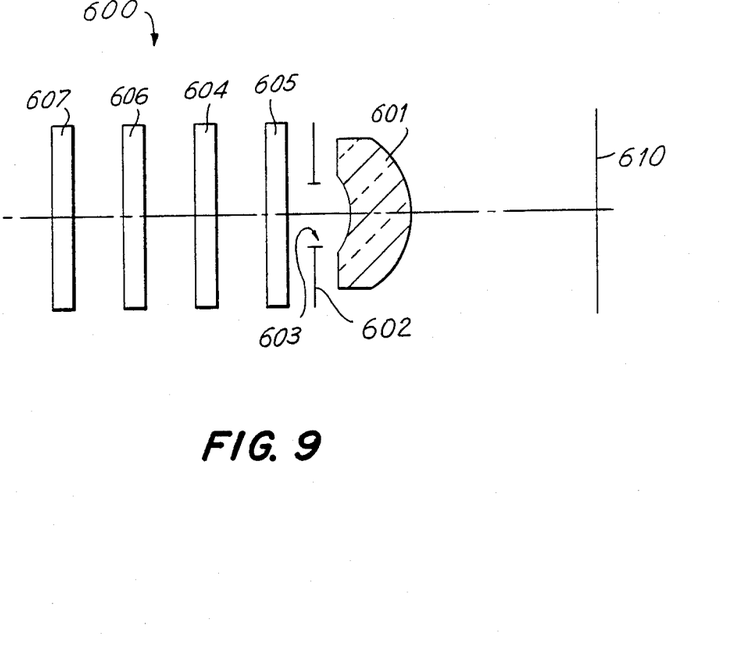
FIG. 9 is a schematic side elevational view of an optical system in accordance with the invention.

Reference is next made to FIG. 9 wherein an optical system constructed in accordance with a preferred embodiment of the invention is depicted. Optical system 600 includes a plastic taking lens 601 which is an aspheric lens of circular cross-section similar to lens 450. An aperture stop member 602, having an opening 603 is placed in front of taking lens 601. Aperture stop member 602 is an opaque member which limits the passage of light through to taking lens 601 so that the area of taking lens 601 contacted by the incoming light is smaller than the aspheric region of taking lens 601. This has the effect of minimizing the optical variance and edge effects at the edge of the aspheric portion.

A yellow-orange filter 604 and an infrared filter 605 are placed in the optical path between the incoming light and taking lens 601. Infrared absorbing filter 605 is used to attenuate the transmission of wavelengths beyond 700 nm. These wavelengths need to be attenuated because the spectral response of the silicon based CCD sensor extends significantly beyond the visible range into the infrared range. Yellow-orange filter 604 is used to attenuate wavelengths of light shorter than about 500 nm. The purpose of this filter is to limit the spectral transmittance of the optical system at short wavelengths. Because the taking lens is a single element, it exhibits chromatic aberration. To limit this aberration, which causes the focal length to vary with wavelength (i.e. the color), the spectral pass band of the optical system must be limited.

In connection with a black and white video system, the spectral pass band can be limited to the range of about 500-750 nm and even more preferably 550-700 nm while retaining high quality black and white picture information. Use of the yellow-orange and infrared filters cut out the blue and red ends of the spectrum. Yellow-orange filter 604 may be formed in a preferred embodiment as a dyed plastic injection molded component which is separate from taking lens 601 or may be included as a dye in plastic taking lens 601.

In one embodiment, yellow-orange filter 604 may be formed with a metallic neutral density filter over a portion of it to reduce the overall light intensity reaching CCD 610. The metallic neutral density filter can be rotably mounted in an off center manner as shown similarly in FIG. 4 so that rotation places the filter in front of or not in front of yellow-orange filter 604. In this way the neutral density filter is either in or out of the optical path. As shown in FIG. 9, a separate neutral density metallic filter 606 is shown. However, neutral density metallic filter 606 may be formed as a portion of yellow-orange filter 604. The neutral density metallic filter provides necessary attenuation over both the visible and infrared spectrums. A filter of Inconel, aluminum, nickel or other metal can provide both the necessary visible and infrared attenuation. In addition, a further neutral density filter 607 may be used in only outdoor light situations to provide two ranges of light sensitivity, thereby expanding the useful range of lighting conditions under which the CCD sensor will function without operating in its saturation level.

Infrared filter 605 may be formed of heat absorbing glass in a preferred embodiment which is an inexpensive component. Generally, the infrared filter limits transmission of light in the infrared frequency ranges to about 2-3%. The infrared attenuation can also be provided by dispersing special organic dyes in plastic taking lens 601 or yellow-orange filter 604. Thus, both the infrared filter and the yellow-orange filter can be introduced as dyes in plastic taking lens 601 rather than being formed as separate components as shown in FIG. 9.

Figure 5:
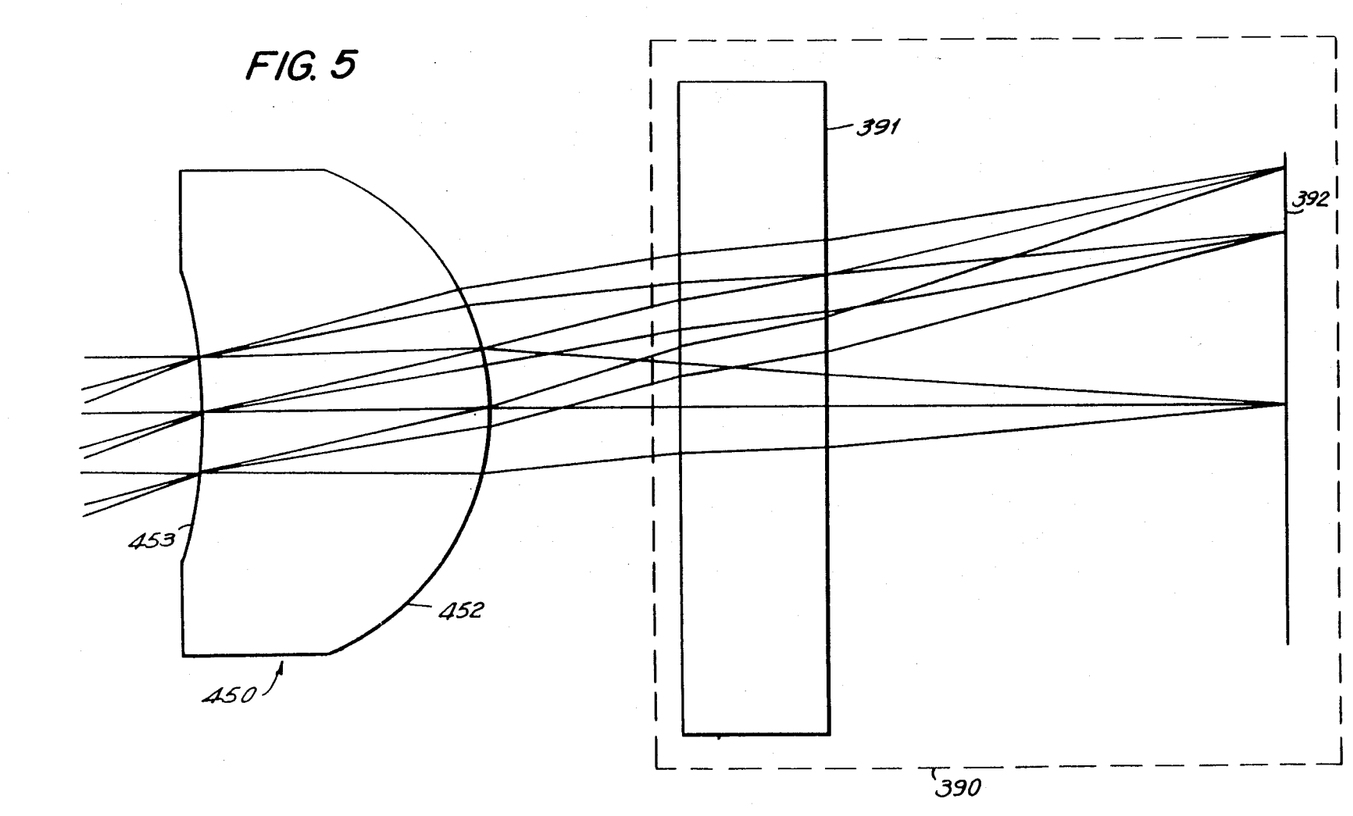
FIG. 5 is a schematic side elevational view of the aspheric lens, CCD window and CCD surface in accordance with a preferred embodiment, of the optical system.

Reference is next made to FIG. 5 wherein a schematic side elevational view of the optical system constructed in accordance with a first preferred embodiment of the invention is depicted. The optical system includes lens 450 and CCD array 390. CCD array 390 includes a CCD window 391 through which light passes and CCD surface 392 where the incident light is integrated into electrical signals. In a preferred embodiment the CCD window 391 is approximately 0.77 mm thick and is placed no more than 2.0 mm in front of CCD surface 392. As a result, the back focal length requirement of surface 452 must be greater than 2.8 mm. The portion of lens 450 through which light will pass and contact CCD surface 392 is smaller than aspheric concave portion 453. Surface 453 is made significantly larger than necessary to minimize the distortion at the edges of the optical surface caused by the manufacturing process. In accordance with the depicted arrangement the distortion is less than four percent in the corners of the field. This compares favorably with the corner distortion in many home video cameras which exceeds six percent at times. The lines in FIG. 5 indicate the manner in which light is transmitted through lens 450 to CCD surface 392.

The extremely compact design of aspheric lens 450 and CCD array 390 significantly cuts the cost of producing camcorder 100. Aspheric lens 450 provides all of the optics required. Protective layer 360 seals the area around lens 450 and CCD array 390. Because of the almost microscopic dimensions of these elements any dust or smudges on the lens would significantly impair performance. However, with protective layer 360 in place and flared section 350 extending outwardly the optical system is well protected. Lens 450 can operate at F4.5 with the optical system as configured with an aspherical surface and equally well at F5.6 with a spherical lens.

Figure 6:
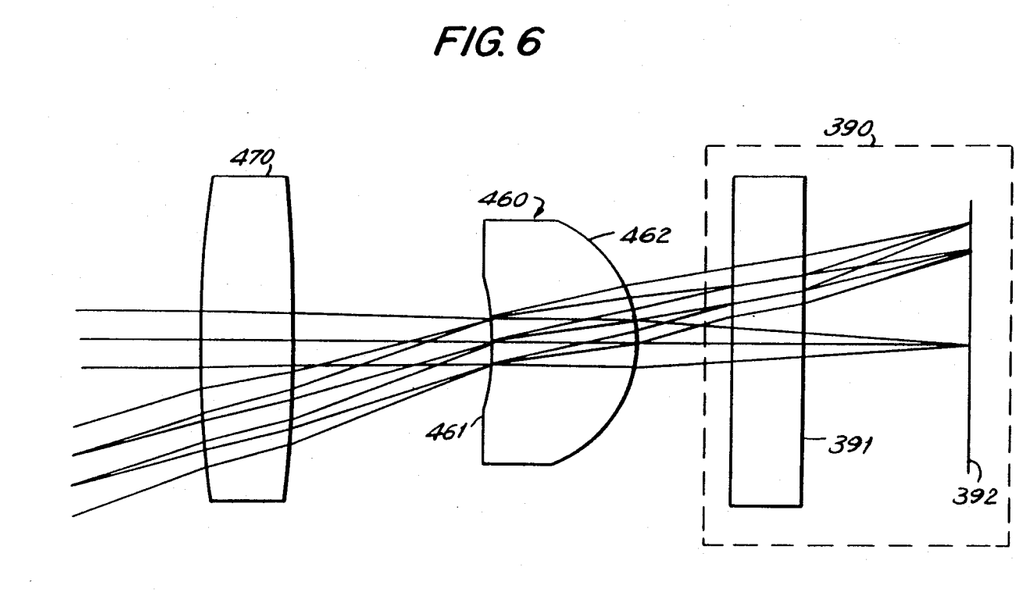
FIG. 6 is a schematic side elevational view similar to FIG. 5 of a lens array, CCD window and CCD surface constructed in accordance with a second embodiment of the optical system.

Reference is next made to FIG. 6 wherein an optical system constructed in accordance with a second preferred embodiment of the invention is depicted. The optical system still includes CCD array 390 with window 391 and CCD surface 392. However, instead of single lens 450, the embodiment of FIG. 6 includes two lenses 460 and 470. Lens 460 has a back surface 462 similar to back surface 452 of lens 450. However, the front surface 461 of lens 460 is not aspheric in shape. A separate lens 470 is used to provide the correction to compensate for the correction provided by aspheric concavity 453 in lens 450 of the first embodiment. The advantage of the embodiment of FIG. 5 is the single lens which minimizes the cost of assembly and obviates the precise alignment required between lenses 460 and 470 in FIG. 6.

Figure 7:
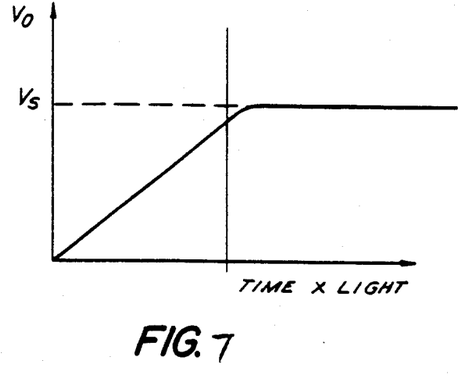
FIG. 7 is a graphical comparison of the output voltage as a function of the product of the incident light and time of exposure.

Reference is next made to FIG. 7 wherein a graph showing the relationship between the output voltage $V_0$ and the product of the intensity of incident light and time is shown for a CCD array. As shown, the output voltage $V_0$ increases linearly as the product of the time and light increases up to a saturation voltage $V_S$. Above the saturation voltage there is no significant additional output voltage for additional incident light. As a result, it is desirable to operate the CCD array in the linear portion of the curve. In relatively low light situations the CCD array will normally operate in the linear range. However, as the brightness of the light increases such that the product of the brightness of the light and the sampling period for each pixel extends into the saturation region, a loss of the gray scale in the black and white embodiment and a lack of color distinctiveness in the color embodiment results.

Thus, in a high light situation the CCD array can be made to operate in its linear range only by reducing the intensity of the light or reducing the sampling period for the CCD array. Varying the intensity of the light is difficult, cumbersome and not well suited to rapid and constant adjustment. In a changing light situation it is desirable to constantly adjust the time of exposure of the CCD array.

Figure 8:
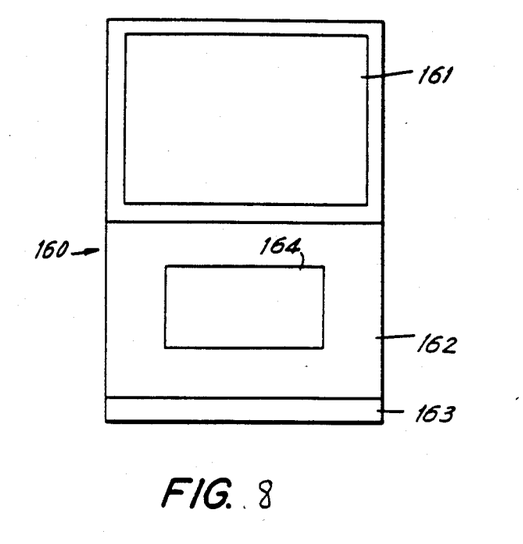
FIG. 8 is a block diagram of the CCD array.

Reference is next made to FIG. 8 wherein a block diagram of a CCD array chip 160 constructed in accordance with the preferred embodiment of the invention is depicted. Chip 160 includes a charge coupled device image area 161 with 120 columns and 90 rows or lines. Image lines 1 through 90 are represented by $I_1, I_2, \ldots I_{90}$. Chip 160 also includes a storage area 162 and a shift register circuit 163. The lines in storage area 62 are likewise identified as $S_1, S_2, \ldots S_{90}$. Shift register 163 is designed to shift the 90 lines of video information from image area 161 to storage area 162, from which it can be read out. However, shift register 163 also can shift data in the opposite direction. In the ordinary course of operation the signal created in image area 161 is shifted to occupy the 90 lines of storage area 162 under the control of a 15 Hz clock. However, there are situations in which the light contacting the image area 161 during the 1/15th of a second extends into the saturation region.

The CCD array does not operate at the standard TV rate. As a result, the components do not ave to function at the extremely high operating speeds of standard TV components and there is time to inexpensively process the data.

To appropriately adjust the exposure time of the CCD array for operation in the linear rather than the saturation region, an auto irising area 164 is established within storage area 162. The auto irising area 164 in a preferred embodiment is the center 40% of the image or storage areas. The signals in this auto irising area is integrated and compared with an optimal value. Based on this comparison a determination is made whether the exposure time should be increased or decreased. The time required to transfer a frame of data from image area 161 to storage area 162 is significantly less than the exposure time. For example, in the preferred embodiment the CCD array shifts 90 lines of image data in about 40 $\mu$s whereas the CCD array integrates the incident light for about 60 ms, a ratio of 1:1500.

If the integration of the auto irising section 164 determines that the CCD array is being overexposed to incident light, at an appropriate time, the shift register performs a reverse transfer transferring a "black" signal to all 90 lines $I_1$-$I_{90}$ of the image area 161. This has the effect of causing whatever image has already been stored in the image area to migrate upward and off of the image area. To assure that the voltage does not accumulate on the upper rows of image area 161, the reverse transfer generally transfers several additional "black" lines into image area 161. After the reverse transfer is completed, image area 161 again begins integrating the light received at each of the pixel locations.

If too much light is detected in the integration of the auto irising area, the time at which the reverse transfer operation occurs is delayed to later in the 15 Hz cycle. This results in the exposure time during which the CCD array integrates light for transfer to the storage area to be reduced. On the other hand, if the integration of the auto irising area determines that the CCD array can integrate additional light without saturating, the period during which the CCD integrates light for transfer to the storage area can be increased. This is achieved by performing the reverse transfer operation earlier in the 15 Hz cycle.

In a preferred embodiment the auto irising system is capable of adjusting the exposure time to 90 levels, one level each frame. This 90:1 irising is equivalent to about 6 F stops of adjustment. The automatic gain control amplifiers in VCR circuit 200 adds two more F stops of adjustability. Further, by adding a mechanical optical filter in the optical path the filter can act as an indoor-outdoor switch which shifts the CCD array's sensitivity between the range of lighting generally encountered indoors and outdoors. If the system is set for the indoor position, and there is too much light even with the maximum auto irising adjustment, the camcorder can signal the user to change the indoor-outdoor switch from the indoor position to the outdoor position. Likewise, under low light situations the camcorder can alert the user to shift the indooroutdoor switch from the outdoor position to the indoor position. This further expands the breadth of F stops in which the camcorder can be effectively utilized.

Additional lenses such as telephoto, zoom and wide angle lenses can be added to the camcorder, either separately or on a rotatable ring in the unit. Add on components such as a playback light or playback monitor can also be added to the camcorder.

Accordingly, an optical system for a camcorder which utilizes a small matrix CCD array, which operates slower than the standard TV rate, is provided. The resolution of the smaller array is entirely sufficient for many applications and provides the benefit of increased time for processing. This allows for significant signal manipulation, such as the auto irising adjustment, which replaces manual systems for adjusting incident light levels and minimizes the need for constant light conditions. The rate conversion between the slow scan CCD array and the high speed standard video signal is performed using the ping-pong RAM as a high speed video source. The optics select a suitable portion of the incoming light so that the CCD array may function appropriately under a wide variation of lighting conditions.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. An optical system for imaging a scene onto a low resolution photodetector, the photodetector having a spectral sensitivity extending over a predetermined bandwidth ranging from a blue light region to an infrared light region of the light spectrum and being adapted to provide a video signal for either recording and playing back the scene, said optical system comprising:

imaging means, having no more than two refractive lens elements which provide optical power for the optical system, for controlling aberrations tending to reduce the quality of an image provided by the video signal except for aberrations primarily attributable to residual longitudinal chromatic aberrations from light from said scene in said blue light region of said light spectrum; and filter means for filtering light reflected from said scene to said photodetector to limit the spectral content of said reflective light to a bandwidth narrower than said given bandwidth of said photodetector, said narrower bandwidth not including said infrared light region and not including said blue light region, whereby contributions to the video signal consisting of infrared light reflected from said scene are eliminated, enhancing the contribution of the visible light region thereby improving the contrast of the image of the scene when recorded or played back and whereby contributions to the video signal consisting of blue light reflected from said scene are eliminated, eliminating the degrading affects of said residual chromatic aberrations on the video signal, thereby improving the video signal quality and sharpness of the scene when recorded and played back.

2. The optical system of claim 1, wherein said imaging means includes a single refractive lens element and an aperture stop located forward of said refractive lens element along a path of light entering said optical system.

3. The optical system of claim 2, wherein said single reflective lens element is a meniscus lens.

4. The optical system of claim 3, wherein said single refractive meniscus lens element has an aspheric front surface and a spherical rear surface.

5. The optical system of claim 4, wherein said front surface and said rear surface are both concave to object space.

6. The optical system of claim 5, wherein the apex of said spherical front surface is at the center of curvature of said spherical rear surface.

7. The optical system of claim 6, wherein said single refractive meniscus lens has a circular cross section, the diameter being about 2.75 nm and the thickness from the front surface to the rear surface being about 1.55 nm.

8. The optical system of claim 4, wherein the radius of curvature of the concave spherical front surface is approximately 8.8 nm.

9. The optical system of claim 4, wherein the radius of curvature of the back surface is about 1.6 nm.

10. The optical system of claim 4, wherein said front surface and said rear surface are formed integrally as a single lens element.

11. The optical system of claim 1, further comprising second filter means in the optical path between the reflective light and the photodetector for selectively attenuating the reflected light.

12. The optical system of claim 11, wherein said second filter means includes a neutral density filter.

13. The optical system of claim 12, wherein said second filter means is movable between an operative position in the optical path to an inoperative position outside the optical path.

14. The optical system of claim 1, wherein said first filtering means attenuates the transmission of wavelengths longer than about 700 nm.

15. The optical system of claim 1, wherein the infrared filtering means is formed as a separate member in the optical path between said reflected light and at least one of said refractive lens elements.

16. The optical system of claim 1, wherein the infrared filtering means is formed as organic dyes dispersed in the imaging means.

17. The optical system of claim 1, wherein said filter means includes a yellow orange filter which has a cut off wavelength in the range of about 500-550 nm.

18. The optical system of claim 17, wherein the yellow orange filter is formed separately from the lens element and is spaced in the optical path between the outside light and at least one of lens element.

19. The optical system of claim 17, wherein said yellow orange filter is formed by the pressure of dyes in the lens elements.

20. The optical system of claim 1, wherein said lens elements are made of plastic.

21. The optical system of claim 20, wherein the plastic lens is formed of acrylic.

22. The optical system of claim 1, wherein the low resolution photodetector is a CCD light sensor.

23. The optical system of claim 12, wherein said neutral density filter is made of a metal.

24. The optical system of claim 10, further comprising an aperture stop, said single lens having a front surface proximate said aperture stop and a rear spherical surface concentric about said aperture stop.

25. An optical system for imaging a scene onto a CCD light sensor of a camcorder, the CCD light sensor having a spectral sensitivity extending over a predetermined bandwidth ranging from a blue light region to an infrared light region of the light spectrum and being adapted to provide a video signal for either recording or playing back the scene, said optical system comprising:
imaging means having no more than two refractive lens elements which provide the optical power for the optical system for controlling aberrations tending to reduce the quality of an image provided by the video signal not including aberrations primarily attributable to residual longitudinal chromatic aberrations from light reflected from said scene in said blue light region of said light spectrum; and
filter means for filtering light reflected from said scene to said camcorder to limit the spectral content of said reflective light to a bandwidth narrower than said given bandwidth of said photodetector, said narrower bandwidth not including said infrared light region and not including said blue light region, whereby contributions to the video signal consisting of infrared light reflected from said scene are eliminated, enhancing the contribution of the visible light region thereby improving the contrast of the image of the scene when recorded or played back and whereby contributions to the video signal consisting of blue light reflected from said scene are eliminated, eliminating degrading affects of said residual chromatic aberrations on the video signal, thereby improving the video signal quality and sharpness of the scene when recorded and played back.

26. An objective lens comprising:
an aperture stop mounted along an optical axis;
a positive meniscus lens element mounted along the optical axis in alignment with said aperture stop, said positive lens element having a front negative surface proximate said aperture stop, concave to object space, to diverge incident rays, followed by a positive spherical rear surface whose radius is substantially concentric about said aperture stop where said aperture stop intersects said optical axis.

27. The objective lens of claim 26, wherein the power of said negative and positive surfaces are such that said objective lens is a reverse telephoto lens with a back focal length longer than the focal length of said objective lens.

28. The objective lens of claim 26, wherein said front negative surface has positive astigmatism which operates to flatten the tangential field of curvature of said objective lens.

29. The objective lens of claim 27, wherein said front negative surface is aspheric to correct for spherical aberration.

30. The objective lens of claim 26, wherein said lens element is molded of relatively low dispersion optical material.

31. The objective lens of claim 30, wherein said optical material is acrylic plastic.

32. The objective lens of claim 26, wherein said lens element is fabricated of an optical material having a predetermined spectral transmittance and dispersion which permits a portion of the light entering the system to be poorly focused providing said objective lens with longitudinal chromatic aberrations, said objective lens further including filter means for excluding that portion of light which contributes to said longitudinal chromatic aberration from passing through said positive meniscus lens element.

33. The objective lens of claim 32, wherein said filtering means is formed integrally with said positive meniscus lens element.

34. The objective lens of claim 26, wherein the relative aperture is within the range between f/4.5 and f/5.6.

* * * * *